US008414319B2

(12) United States Patent
Patel et al.

(10) Patent No.: US 8,414,319 B2
(45) Date of Patent: Apr. 9, 2013

(54) PATCH CORD WITH INSERTION DETECTION AND LIGHT ILLUMINATION CAPABILITIES

(75) Inventors: Satish I. Patel, Roselle, IL (US); James E. Wiemeyer, Homer Glen, IL (US); Keith S. Maranto, Frankfort, IL (US); Brad M. Baber, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 13/618,202

(22) Filed: Sep. 14, 2012

(65) Prior Publication Data
US 2013/0012043 A1    Jan. 10, 2013

Related U.S. Application Data

(63) Continuation of application No. 12/641,933, filed on Dec. 18, 2009, now Pat. No. 8,267,706.

(60) Provisional application No. 61/142,022, filed on Dec. 31, 2008, provisional application No. 61/113,868, filed on Nov. 12, 2008.

(51) Int. Cl.
*H01R 29/00* (2006.01)
(52) U.S. Cl. .................................................. 439/188
(58) Field of Classification Search ............ 439/188, 439/488–491, 495, 578, 354, 540.1
See application file for complete search history.

(56) References Cited

U.S. PATENT DOCUMENTS

| 3,052,842 A | 9/1962 | Frohman et al. |
| 3,431,428 A | 3/1969 | Van Valer |
| 3,573,789 A | 4/1971 | Sharp et al. |
| 3,573,792 A | 4/1971 | Reed |
| 3,914,561 A | 10/1975 | Schardt et al. |
| 4,018,997 A | 4/1977 | Hoover et al. |
| 4,072,827 A | 2/1978 | Oman |
| 4,096,359 A | 6/1978 | Barsellotti |
| 4,140,885 A | 2/1979 | Verhagen |

(Continued)

FOREIGN PATENT DOCUMENTS

| EP | 0297079 B1 | 3/1992 |
| EP | 0575100 B1 | 12/1993 |

(Continued)

OTHER PUBLICATIONS

Fairchild Semiconductor "LM555/NE555/SA555 Single Timer", Nov. 29, 2002, 14 pages.

(Continued)

*Primary Examiner* — Jean F Duverne
(74) *Attorney, Agent, or Firm* — Robert A. McCann; Christopher S. Clancy; Christopher K. Marlow

(57) ABSTRACT

A patch cord for an intelligent patching system is provided. The patch cord is a ten-wire patch cord having a patch panel plug and a switch plug. The patch panel plug contains ninth and tenth wire contacts that interface with ninth and tenth wire contacts of an intelligent patch panel port. The switch plug is provided with a plunger-style switch that enables the intelligent patch panel to determine when the switch plug is plugged into a switch port. The switch plug is also provided with LED's and circuitry that controls the LED's.

4 Claims, 7 Drawing Sheets

U.S. PATENT DOCUMENTS

| | | | |
|---|---|---|---|
| 4,169,220 A | 9/1979 | Fields | |
| 4,196,316 A | 4/1980 | McEowen et al. | |
| 4,517,619 A | 5/1985 | Uekubo | |
| 4,673,246 A | 6/1987 | Schembri | |
| 4,773,867 A | 9/1988 | Keller et al. | |
| 4,796,294 A | 1/1989 | Nakagawara | |
| 4,869,566 A | 9/1989 | Juso et al. | |
| 4,890,102 A | 12/1989 | Oliver | |
| 4,901,004 A | 2/1990 | King | |
| 4,937,529 A | 6/1990 | O'Toole, III et al. | |
| 4,937,835 A | 6/1990 | Omura | |
| 5,037,167 A | 8/1991 | Beaty | |
| 5,081,627 A | 1/1992 | Yu | |
| 5,107,532 A | 4/1992 | Hansen et al. | |
| 5,111,408 A | 5/1992 | Amjadi | |
| 5,145,380 A | 9/1992 | Holcomb et al. | |
| 5,161,988 A | 11/1992 | Krupka | |
| 5,170,327 A | 12/1992 | Burroughs | |
| 5,204,929 A | 4/1993 | Machall et al. | |
| 5,222,164 A | 6/1993 | Bass, Sr. et al. | |
| 5,226,120 A | 7/1993 | Brown et al. | |
| 5,233,501 A | 8/1993 | Allen et al. | |
| 5,265,187 A | 11/1993 | Morin et al. | |
| 5,270,658 A | 12/1993 | Esptein | |
| 5,305,405 A | 4/1994 | Emmons et al. | |
| 5,353,367 A | 10/1994 | Czosnowski et al. | |
| 5,375,028 A | 12/1994 | Fukunaga | |
| 5,394,503 A | 2/1995 | Dietz, Jr. et al. | |
| 5,432,847 A | 7/1995 | Hill et al. | |
| 5,459,478 A | 10/1995 | Bolger et al. | |
| 5,463,706 A | 10/1995 | Dumont et al. | |
| 5,483,467 A | 1/1996 | Krupka et al. | |
| 5,487,666 A | 1/1996 | DiGiovanni | |
| 5,521,902 A | 5/1996 | Ferguson | |
| 5,532,603 A | 7/1996 | Bottman | |
| 5,546,282 A | 8/1996 | Hill et al. | |
| 5,550,755 A | 8/1996 | Martin et al. | |
| 5,583,874 A | 12/1996 | Smith et al. | |
| 5,666,453 A | 9/1997 | Dannenmann | |
| 5,684,796 A | 11/1997 | Abidi et al. | |
| 5,726,972 A | 3/1998 | Ferguson | |
| 5,727,055 A | 3/1998 | Ivie et al. | |
| 5,754,112 A | 5/1998 | Novak | |
| 5,764,043 A | 6/1998 | Czosnowski et al. | |
| 5,790,041 A | 8/1998 | Lee | |
| 5,832,071 A | 11/1998 | Voelker | |
| 5,847,557 A | 12/1998 | Fincher et al. | |
| 5,854,824 A | 12/1998 | Bengal et al. | |
| 5,870,626 A | 2/1999 | Lebeau | |
| 5,876,240 A | 3/1999 | Derstine et al. | |
| 5,878,030 A | 3/1999 | Norris | |
| 5,892,756 A | 4/1999 | Murphy | |
| 5,898,837 A | 4/1999 | Guttman et al. | |
| 5,915,993 A | 6/1999 | Belopolsky et al. | |
| 5,923,663 A | 7/1999 | Bontemps et al. | |
| 5,944,535 A | 8/1999 | Bullivant et al. | |
| 6,002,331 A | 12/1999 | Laor | |
| 6,041,352 A | 3/2000 | Burdick et al. | |
| 6,067,014 A | 5/2000 | Wilson | |
| 6,078,113 A | 6/2000 | True et al. | |
| 6,086,415 A | 7/2000 | Sanchez et al. | |
| 6,094,261 A | 7/2000 | Contarino, Jr. | |
| 6,168,555 B1 | 1/2001 | Fetterleigh et al. | |
| 6,175,865 B1 | 1/2001 | Dove et al. | |
| 6,222,908 B1 | 4/2001 | Bartolutti et al. | |
| 6,229,538 B1 | 5/2001 | McIntyre et al. | |
| 6,234,830 B1 | 5/2001 | Ensz et al. | |
| 6,243,510 B1 | 6/2001 | Rauch | |
| 6,285,293 B1 | 9/2001 | German et al. | |
| 6,330,307 B1 | 12/2001 | Bloch et al. | |
| 6,350,148 B1 | 2/2002 | Bartolutti et al. | |
| 6,381,283 B1 | 4/2002 | Bhardwaj et al. | |
| 6,421,322 B1 | 7/2002 | Koziy et al. | |
| 6,424,710 B1 | 7/2002 | Bartolutti et al. | |
| 6,434,716 B1 | 8/2002 | Johnson et al. | |
| 6,437,894 B1 | 8/2002 | Gilbert et al. | |
| 6,453,014 B1 | 9/2002 | Jacobson et al. | |
| 6,456,768 B1 | 9/2002 | Boncek et al. | |
| 6,499,861 B1 | 12/2002 | German et al. | |
| 6,522,737 B1 | 2/2003 | Bartolutti et al. | |
| 6,537,110 B1 | 3/2003 | Korsunsky et al. | |
| 6,543,941 B1 | 4/2003 | Lampert | |
| 6,561,827 B2 | 5/2003 | Frostrom et al. | |
| 6,574,586 B1 | 6/2003 | David et al. | |
| 6,577,243 B1 | 6/2003 | Dannenmann et al. | |
| 6,588,938 B1 | 7/2003 | Lampert et al. | |
| 6,601,097 B1 | 7/2003 | Cheston et al. | |
| 6,626,697 B1 | 9/2003 | Martin et al. | |
| 6,629,269 B1 | 9/2003 | Kahkoska | |
| 6,684,179 B1 | 1/2004 | David | |
| 6,688,910 B1 | 2/2004 | Macauley | |
| 6,714,698 B2 | 3/2004 | Pfeiffer et al. | |
| 6,725,177 B2 | 4/2004 | David et al. | |
| 6,750,643 B2 | 6/2004 | Hwang et al. | |
| 6,778,911 B2 | 8/2004 | Opsal et al. | |
| 6,784,802 B1 | 8/2004 | Stanescu | |
| 6,798,944 B2 | 9/2004 | Pfeiffer et al. | |
| 6,802,735 B2 | 10/2004 | Pepe et al. | |
| 6,823,063 B2 | 11/2004 | Mendoza | |
| 6,857,897 B2 | 2/2005 | Conn | |
| 6,871,156 B2 | 3/2005 | Wallace et al. | |
| 6,894,480 B2 | 5/2005 | Back | |
| 6,898,368 B2 | 5/2005 | Colombo et al. | |
| 6,905,363 B2 | 6/2005 | Musolf et al. | |
| 6,906,505 B2 | 6/2005 | Brunet et al. | |
| 6,975,242 B2 | 12/2005 | Dannenmann et al. | |
| 6,992,491 B1 | 1/2006 | Lo et al. | |
| 7,005,861 B1 | 2/2006 | Lo et al. | |
| 7,027,704 B2 | 4/2006 | Frohlich et al. | |
| 7,028,087 B2 | 4/2006 | Caveney | |
| 7,029,137 B2 | 4/2006 | Lionetti et al. | |
| 7,038,135 B1 | 5/2006 | Chan et al. | |
| 7,049,937 B1 | 5/2006 | Zweig et al. | |
| 7,068,043 B1 | 6/2006 | Lo et al. | |
| 7,068,044 B1 | 6/2006 | Lo et al. | |
| 7,160,143 B2 | 1/2007 | David et al. | |
| 7,207,846 B2 | 4/2007 | Caveney et al. | |
| 7,234,944 B2 | 6/2007 | Nordin et al. | |
| 8,267,706 B2 * | 9/2012 | Patel et al. | 439/188 |
| 2002/0069277 A1 | 6/2002 | Caveney | |
| 2002/0071394 A1 | 6/2002 | Koziy et al. | |
| 2002/0090858 A1 | 7/2002 | Caveney | |
| 2002/0116485 A1 | 8/2002 | Black et al. | |
| 2003/0054699 A1 | 3/2003 | Sato et al. | |
| 2003/0061393 A1 | 3/2003 | Steegmans et al. | |
| 2003/0073343 A1 | 4/2003 | Belesimo | |
| 2003/0152087 A1 | 8/2003 | Shahoumian et al. | |
| 2004/0044599 A1 | 3/2004 | Kepner et al. | |
| 2004/0052471 A1 | 3/2004 | Colombo et al. | |
| 2004/0065470 A1 | 4/2004 | Goodison et al. | |
| 2004/0073597 A1 | 4/2004 | Caveney et al. | |
| 2004/0077220 A1 | 4/2004 | Musolf et al. | |
| 2004/0219827 A1 | 11/2004 | David et al. | |
| 2005/0052174 A1 | 3/2005 | Angelo et al. | |
| 2005/0111491 A1 | 5/2005 | Caveney | |
| 2005/0136729 A1 | 6/2005 | Redfield et al. | |
| 2005/0141431 A1 | 6/2005 | Caveney et al. | |
| 2005/0186819 A1 | 8/2005 | Velleca et al. | |
| 2005/0195584 A1 | 9/2005 | AbuGhazaleh et al. | |
| 2005/0224585 A1 | 10/2005 | Durrant et al. | |
| 2005/0231325 A1 | 10/2005 | Durrant et al. | |
| 2005/0239339 A1 | 10/2005 | Pepe | |
| 2005/0245127 A1 | 11/2005 | Nordin et al. | |
| 2006/0047800 A1 | 3/2006 | Caveney et al. | |
| 2006/0057876 A1 | 3/2006 | Dannenmann et al. | |
| 2006/0282529 A1 | 12/2006 | Nordin et al. | |
| 2007/0032124 A1 | 2/2007 | Nordin et al. | |
| 2007/0132503 A1 | 6/2007 | Nordin | |

FOREIGN PATENT DOCUMENTS

| | | |
|---|---|---|
| EP | 0993082 A1 | 4/2000 |
| EP | 0745229 B1 | 3/2003 |
| EP | 1788825 A2 | 5/2007 |
| FR | 2680067 A1 | 2/1993 |
| GB | 2236398 A | 4/1991 |
| GB | 2347751 A | 9/2000 |
| GB | 2347752 A | 9/2000 |

| | | |
|---|---|---|
| JP | 676878 | 3/1994 |
| JP | 2004349184 | 12/2004 |
| WO | 9926426 A1 | 5/1999 |
| WO | 0060475 A1 | 10/2000 |
| WO | 0155854 A1 | 8/2001 |
| WO | 0203552 A2 | 1/2002 |
| WO | 2004044599 A2 | 3/2004 |
| WO | 2005072156 A2 | 8/2005 |
| WO | 2006052686 A1 | 5/2006 |
| WO | 2008045512 A1 | 4/2008 |

OTHER PUBLICATIONS

"Finding the Missing Link," Cabling Installation & Maintenance, Jun./Jul. 2002.

"IntelliMAC—The New Intelligent Cable Management Solution by ITRACS & NORDX/CDT," Press Release 2003.

"RiT Technologies Ltd. Smart Cabling System," RiT Technologies Ltd., 2004.

"Ortronics Launches iTRACS—Ready Structured Cabling Solutions," News Release Mar. 7, 2003.

"The SYSTIMAX iPatch System—Intelligent yet simple patching . . . ", CommScope, Inc., 2004.

"White Paper—intelligent Patching." David Wilson, Nov. 2002.

"PatchView for the Enterprise (PV4E) technical backround/Networks for Business," Jun. 24-26, 2003.

"RiT Technologies Ltd. Go Patch-less," May 2000 Edition of Cabling Systems.

"Molex Premise Networks/Western Europe—Real Time Patching System" Molex Prem. Networks, 2001.

* cited by examiner

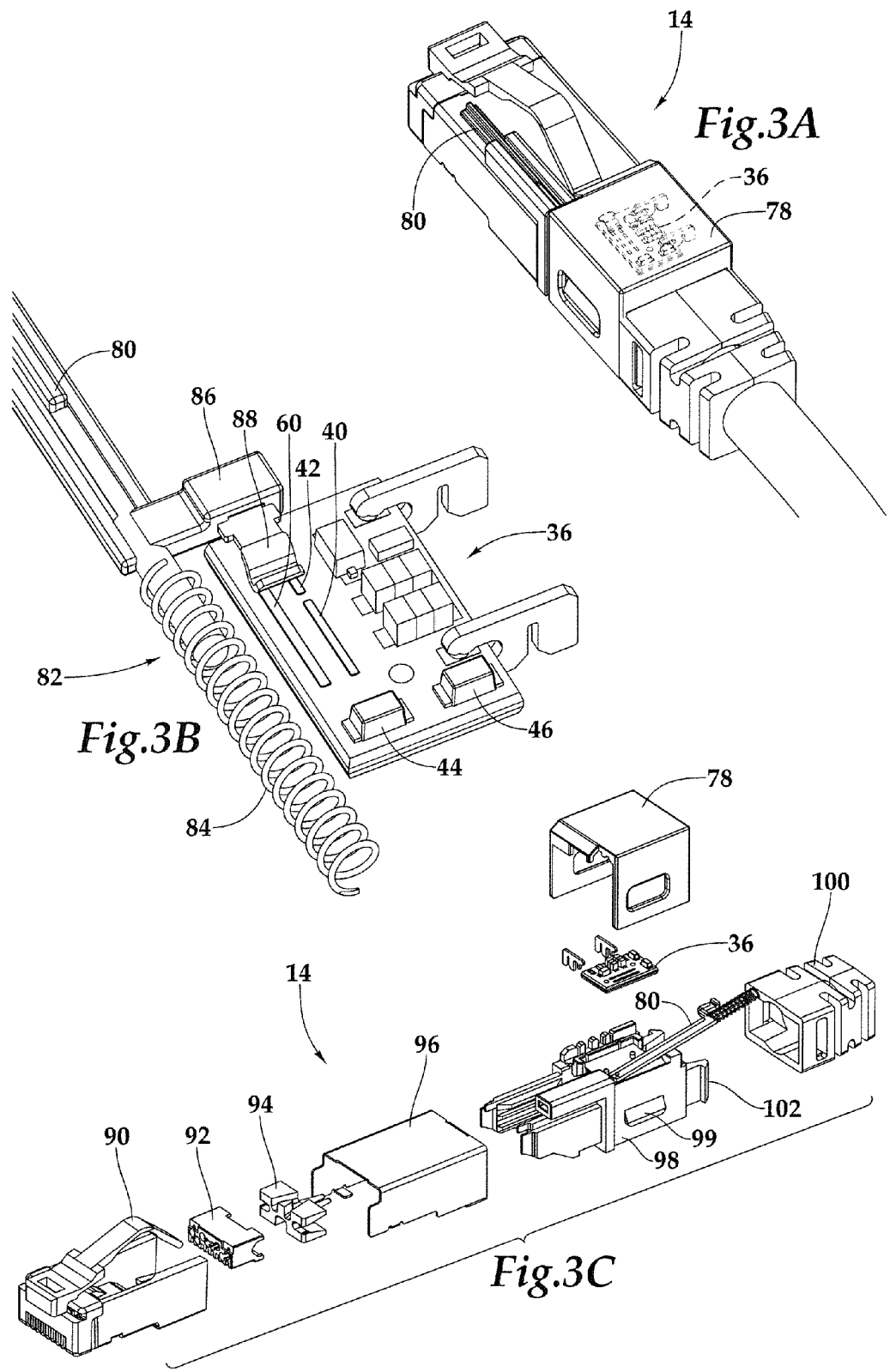

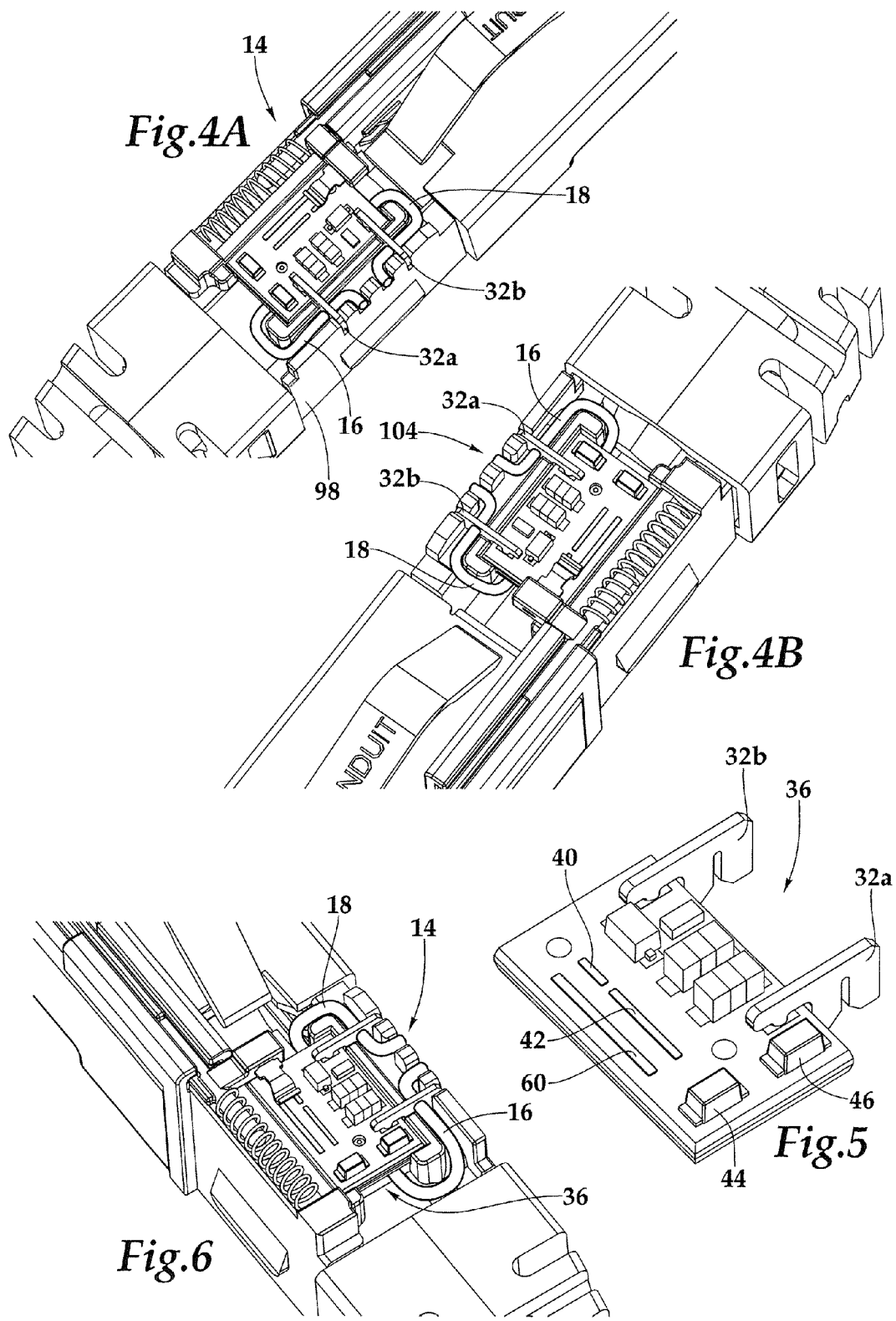

PATCH CORD WITH INSERTION DETECTION AND LIGHT ILLUMINATION CAPABILITIES

INCORPORATION BY REFERENCE

The present application is a continuation of U.S. patent application Ser. No. 12/641,933, filed Dec. 18, 2009, which claims the benefit of U.S. Provisional Application No. 61/142,022, filed Dec. 31, 2008, the entirety of which is herein incorporated by reference. The present application also incorporates by reference in its entirety U.S. Provisional Patent Application Ser. No. 61/113,868, entitled "Intelligent Patching System" and filed on Nov. 12, 2008.

TECHNICAL FIELD

The present application relates to network documentation and revision systems, and more particularly to a patch cord that enables insertion and removal detection as well as visual guidance cues for patch cord installation or removal.

BACKGROUND

Communications networks are growing in number and complexity, and are continually being interconnected to satisfy customers' needs. Patch panels are used in communications networks as intermediate elements between horizontal cabling (to which endpoint devices such as computers and telephones are connected) and network switches. Specifically, patch panels include a panel of network ports that connect incoming and outgoing lines of a local area network (LAN) or other communication system. In a LAN, for example, the patch panel connects the network's computers to switches or routers that enable the LAN to connect to the Internet or another wide area network (WAN). Connections are made with patch cords. The patch panel allows connections to be arranged and rearranged by plugging and unplugging the patch cords.

When physical connections between endpoint devices and network switches are added, moved or removed, patch panels are the points at which technicians complete the required installations or removals of patch cords within patch fields. Patch panels offer the convenience of allowing technicians to quickly change the path of selected signals.

Patch panels are typically deployed in one of two different configurations: cross-connect, and interconnect. In a cross-connect configuration, two patch panels are disposed between end user devices and a network switch, and in an interconnect configuration, only one patch panel is disposed between the end user devices and a network switch. Cross-connect configurations allow for simplified rearrangements of connections in the patch field, while interconnect configurations require only one patch panel and do not require patch cords that are dedicated to connection between two patch panels.

Human error associated with the implementation and maintenance of physical cable connections between network communication equipment can result in significant negative impact to a network. Such negative impact can be avoided through improved guidance, control, and verification of network cable installation and removal work orders implemented by network technicians. It is also desirable to provide an easy-to-understand system for technicians to follow when performing moves, adds, and changes (MAC's) to patch cords and connections in a patch field.

SUMMARY

In some embodiments of the present invention, patch cords are provided with circuitry, and lights, such as to allow for the provision of easily followed instructions to a technician performing patch cord MAC's in a patch field.

Systems according to the present invention make use of patch cords having conductors and contacts that are provided for the purpose of patch cord management. Patch cords according to the present invention may be called "ten-wire" patch cords. This term is used in connection with a traditional "eight-wire" copper Ethernet patch cord, comprising four conductive pairs. A "ten-wire" patch cord according to the present invention has two extra conductors dedicated to patch cord management. While the terms "ten-wire" and "tenth" conductors will be used to describe the present invention, it is to be understood that the principles of this invention can be extended to copper patch cords having more or fewer than eight conductors, and also to optical patch cords and copper-fiber hybrid patch cords, any of which may be provided with two extra conductive elements and other hardware to operate in accordance with the present invention.

Patch cords according to the present invention use switches to enable detection of insertion or removal of plugs. In addition, patch cords incorporate LED's or other visible means to guide installation or removal of plugs and to indicate statuses to a technician.

These and other aspects of the present invention are explained to those of ordinary skill in the art in the following detailed description, with reference to the drawings. It should be understood that the embodiments noted herein are not intended to limit the scope of the invention.

BRIEF DESCRIPTION OF FIGURES

FIG. 3A is a perspective view of a switch plug of a patch cord;

FIG. 3B is a perspective view of a switch mechanism in a switch plug of a patch cord, including a detail view of the switch mechanism;

FIG. 3C is an exploded view of a switch plug of a patch cord;

FIG. 4A is a perspective view of a wire termination region of a switch plug including a detail view;

FIG. 4B is another perspective view of the wire termination region of FIG. 4A;

FIG. 5 is a perspective view of a printed circuit board (PCB) assembly of a switch plug;

FIG. 6 is a perspective view of a PCB installed in a switch plug; and

DETAILED DESCRIPTION

Figure 1A:
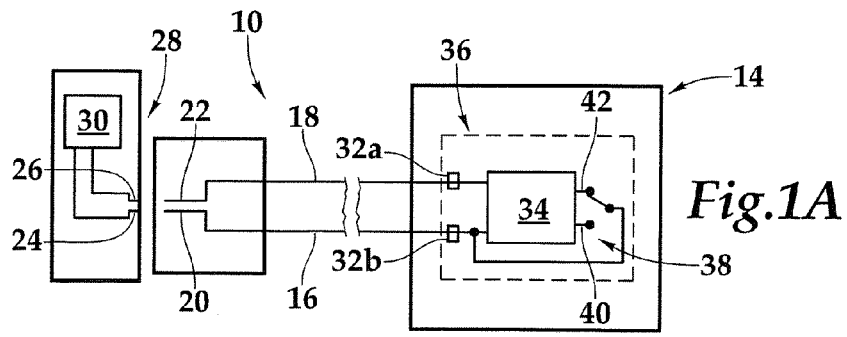
FIG. 1A is a schematic block diagram of a patch cord and intelligent patch panel port according to one embodiment of the present invention.

According to one embodiment of the present invention, as illustrated in schematic block form in FIG. 1A, a patch cord is provided having a patch panel plug 12 for interfacing with ports of an intelligent patch panel and a switch plug 14 for insertion into ports of an Ethernet switch, in an interconnect deployment. The patch cord 10 is provided with a ninth wire 16 and a tenth wire 18 in addition to the normal signal-carrying wires of the patch cord (not shown). The ninth and tenth wires 16 and 18 are terminated at ninth and tenth contacts 20 and 22 of the patch panel plug 12, and the ninth and tenth contacts 20 and 22 are adapted to mate with ninth and tenth contacts 24 and 26 of an intelligent patch panel port 28. The intelligent patch panel port 28 has an associated electronic assembly 30 described in further detail below.

The ninth and tenth wires 16 and 18 of the patch cord 10 are terminated at the switch plug 14 using, for example, insulation displacement contacts 32a and 32b. The ninth and tenth wires are thereby electrically connected to LED circuitry 34 provided on an LED PCB 36. A switch 38, which is preferably a single pole, double throw, make-before-break plunger switch has switch contacts 40 and 42 connected to the LED circuitry 34. Switch contact 40 is a "normally open" contact and switch contact 42 is a "normally closed" contact.

As described in further detail below, the switch 38 has two states, depending on whether or not a plunger associated with the switch plug 14 is depressed. The plunger is depressed when the switch plug 14 is inserted into a port of an Ethernet switch. If a patch cord according to the present invention is inserted into a port of the intelligent patch panel, the intelligent patch panel can then determine based on the state of the switch 38 whether or not the switch plug is plugged into a switch port.

The intelligent patch panel is also able to detect if the ninth and tenth contacts 24 and 26 of the intelligent patch panel port 28 are shorted together, as would occur if a "nine-wire" patch cord were inserted into the intelligent patch panel port 28. If such a condition is detected, the intelligent patch panel may have logic provided within it that will allow the intelligent patch panel to enter an error notification process, and/or to continue with the required move, addition, or change of patch cord status with the understanding that a nine-wire patch cord is being used.

Figure 1B:
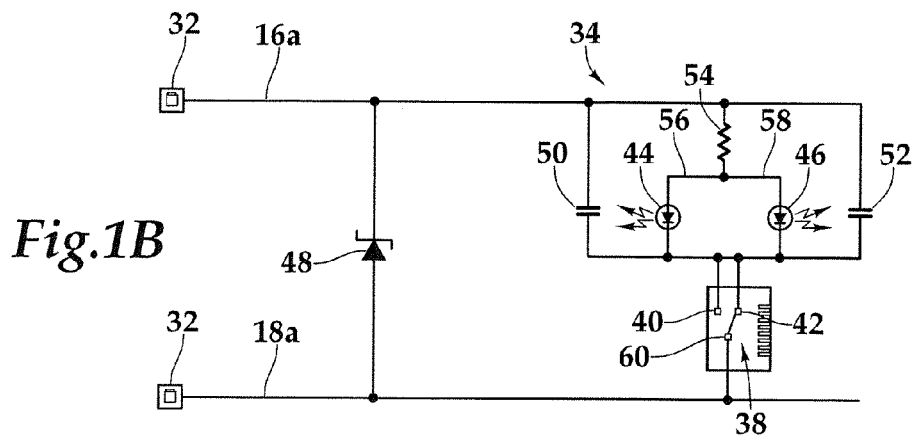
FIG. 1B is a schematic diagram of patch cord circuitry.

The LED circuitry 34 preferably contains two LED's, a red LED 44 and a green LED 46, as shown in FIG. 1B. Generally, the green LED 46 is used to indicate to a technician that an insertion of the switch plug is necessary, and a red LED 46 is used to indicate to a technician that a removal of the switch plug is necessary. Flashing or otherwise timed lights may be used to indicate other conditions, such as error conditions, in some embodiments.

A zener diode 48 provides static discharge protection for the LED's 44 and 46. First and second capacitors 50 and 52 are provided to allow for a detection of the rate of charging of the capacitors by the intelligent patch panel, thereby allowing the intelligent patch panel to determine the state of the switch 38. The first capacitor 50 is between the ninth wire conductor 16a and the first switch contact 40, and the second capacitor 52 is between the ninth wire conductor 16a and the second switch contact 42. A resistor 54 is located on a conductive pathway that extends from the ninth wire conductor 16a. This conductive pathway is split, with a first circuit leg 56 passing through the red LED 44 to the first switch contact and a second circuit leg 58 passing through the green LED 46 to the second switch contact. The switch pole 60 is connected to the tenth wire conductor 18a within the switch plug.

When a patch cord 10 is plugged into an intelligent patch panel port 28, the patch cord 10 is energized through the ninth and tenth wires. Communication is established between the intelligent patch panel and the patch cord 10, and the panel queries the patch cord 10 for switch plug end status information, through a sampling/charging circuit 61 (shown in FIG. 1C) in the intelligent patch panel.

As described in more detail below, the switch 38 is preferably a plunger switch that is depressed when the switch plug 14 is plugged into a switch port. When the switch plug 14 is not inserted into a port, the second switch contact 42 is connected to the pole 60, and when the switch plug 14 is inserted into a port, the first switch contact 40 is connected to the pole 60.

The interaction between an intelligent patch panel and a patch cord 10 according to the present invention will now be described with reference to FIG. 1C. When the patch cord is disconnected from an intelligent patch panel, a patch panel capacitor 62 is the only capacitance present in the sampling/charging circuit 61.

When the patch panel plug 12 of a patch cord 10 is inserted into the intelligent patch panel, and the switch plug is not connected to a switch port, the switch 38 is in a normally closed state and making contact with the green LED 46. In this state, the second capacitor 52 is part of the sampling/charging circuit, and the green LED 46 can be operated by the intelligent patch panel.

When the patch panel plug 12 of a patch cord 10 is inserted into the intelligent patch panel, and the switch plug is connected to a switch port, the switch 38 is in a "normally open" state and making contact with the red LED 44. In this state, the first capacitor 50 is part of the sampling/charging circuit, and the red LED 44 can be operated by the intelligent patch panel.

The intelligent patch panel detects a difference in the rate of charging of the capacitance (i.e., how the voltage is changing across the capacitors) due to the switch position establishing the presence, or absence, of the first capacitor 50, and the second capacitor 52 in the resulting circuit. According to one embodiment, the patch panel capacitor 62 has a capacitance of 0.047 µF, the first capacitor 50 has a capacitance of 0.68 µF, and the second capacitor 52 has a capacitance of 4.7 µF. The resistor 54 has a resistance of 604Ω. The intelligent patch panel is provided with firmware and/or software and microprocessor circuitry, which may be part of a "wing board" assembly.

Figure 1C:
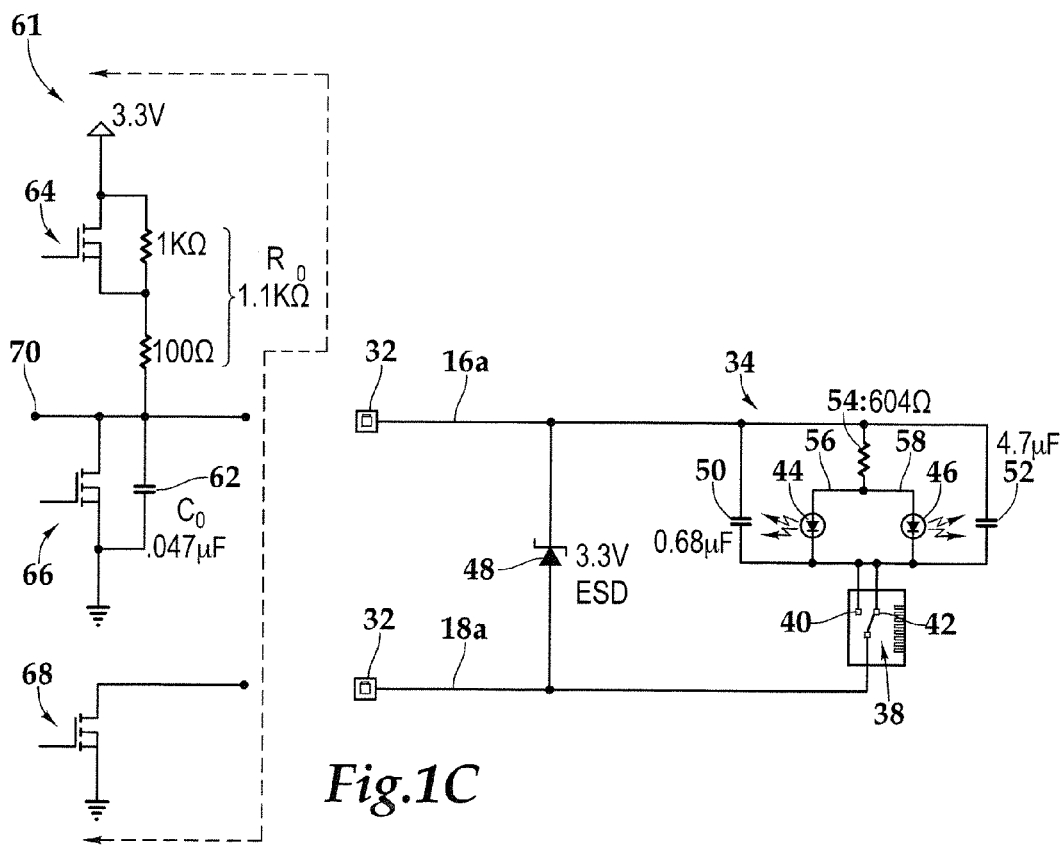
FIG. 1C is a schematic diagram showing circuitry of an intelligent patch panel and circuitry of a patch cord.

In one embodiment, as shown in FIG. 1C, the intelligent patch panel circuitry contains first, second, and third transistors 64, 66, and 68. Sampling of patch cord and switch states may be done in sampling cycles. At the start of a sampling cycle, the first transistor 64 is off, and the second transistor 66 is on, shorting the ninth wire 16 and the ninth wire conductor 16*a* to ground and discharging all capacitors. The second transistor 66 is then turned off (at a time defined as t=0) and the charge rate of the circuit is determined by measuring the elapsed time needed for input 70 to attain a logic high. In this state, the intelligent patch panel is charging, sampling, and discharging whatever capacitance is available on the circuit, and can thereby detect four possible patch cord states: (1) no cord in the system; (2) both plugs of a patch cord inserted into jacks; (3) only the patch panel plug 12 inserted into a jack; and (4) the ninth wire 16 is shorted to the tenth wire 10.

In the embodiment shown, an absence of the patch cord is detected by the quickest charging rate as the patch panel capacitor 62 has the smallest capacitance in the system. When the patch panel plug 12 and the switch plug 14 are mated to their respective panels, the switch 38 places the first capacitor 50 in the circuit along with the patch panel capacitor 62, resulting in a medium charge rate. The longest charge rate occurs when the patch panel plug 12 is mated and the switch plug 14 is unmated, with the result being that the patch panel capacitor 62 and the second capacitor 52 are in the charging circuit. The last possible state would occur with a short occurring between the ninth and tenth wires, which would never allow the input 70 to achieve a logic high condition.

Using the above conditions, the firmware and/or software associated with the intelligent patch panel will be aware of the mated or unmated states of the patch cord. In the remainder of a duty cycle, the intelligent patch panel can elect to illuminate the red LED 44 and the green LED 46 in a variety of formats (such as flashing, occulting, steady-on, steady-off, combinations thereof, etc.). This is accomplished by switching that occurs in the circuitry and logic of the intelligent patch panel in conjunction with the position of the switch 38. When the plug is not inserted, switch 38 causes the green LED 46 to be placed in the circuit, and when the plug is inserted, the red LED 44 is placed in the circuit. Either the red LED 44 or the green LED 46 may be illuminated, depending on the condition of the switch 38, when the first transistor 64 is on, the second transistor 66 is off, and the third transistor 68 is on, which allows current to flow through the LED circuitry 34. The red LED 44 and green LED 46 are illuminated in various formats to indicate various states of the overall system. The LED's are turned off by turning off the third transistor 68. Flashing the LED's is accomplished by turning the LED's on and off as described above. The intelligent patch panel catalogs and forwards this information to layer management software for diagnostics or relevant operations as patching state changes. In FIG. 1C, the elements to the left of the dotted arrow are hardware elements that are located on the wing board of a patch panel.

Figure 2A:
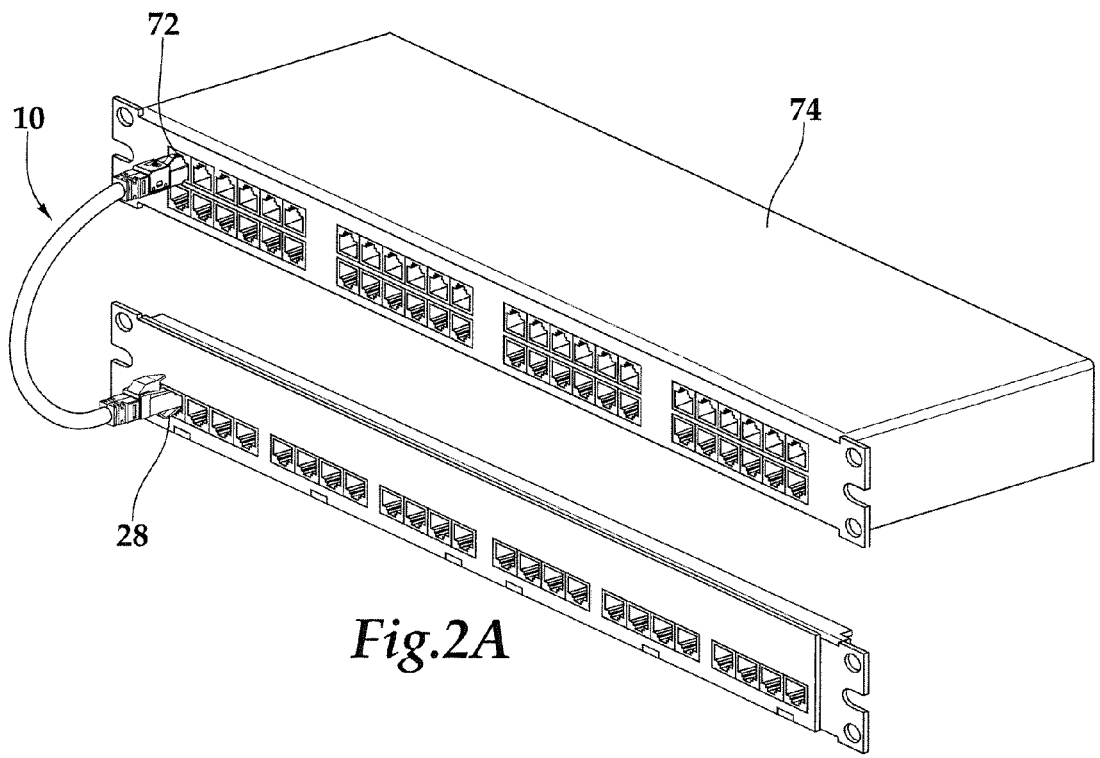
FIG. 2A is a perspective diagram showing a network switch and an intelligent patch panel connected by a patch cord.
Figure 2B:
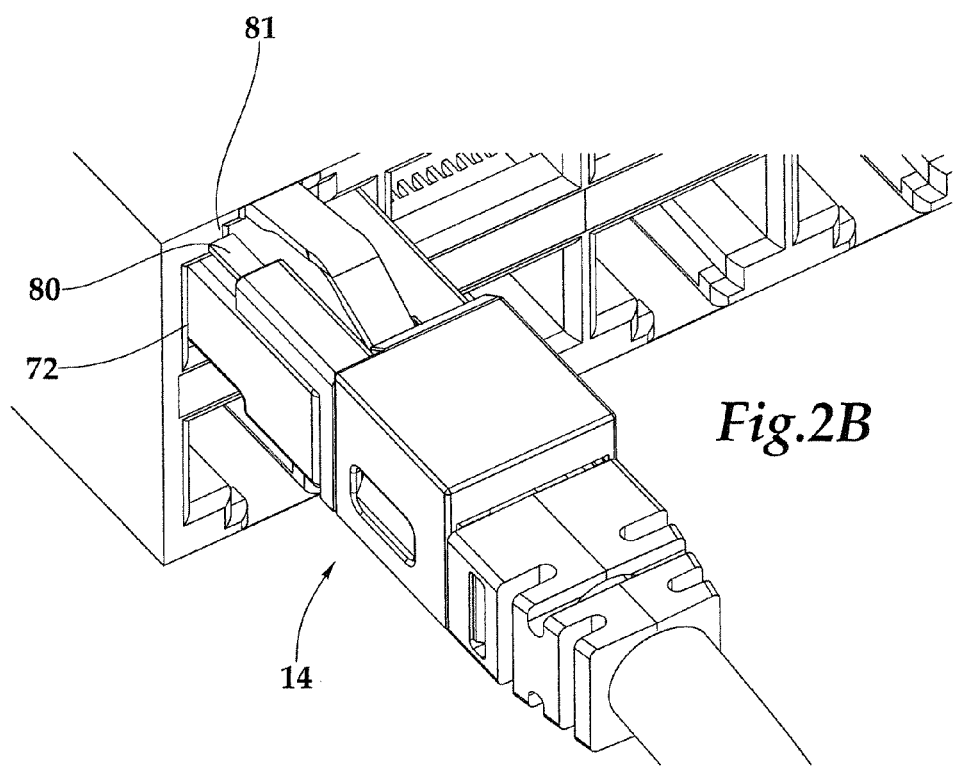
FIG. 2B is a perspective view of a switch plug of a patch cord plugged into a switch port.
Figure 2C:
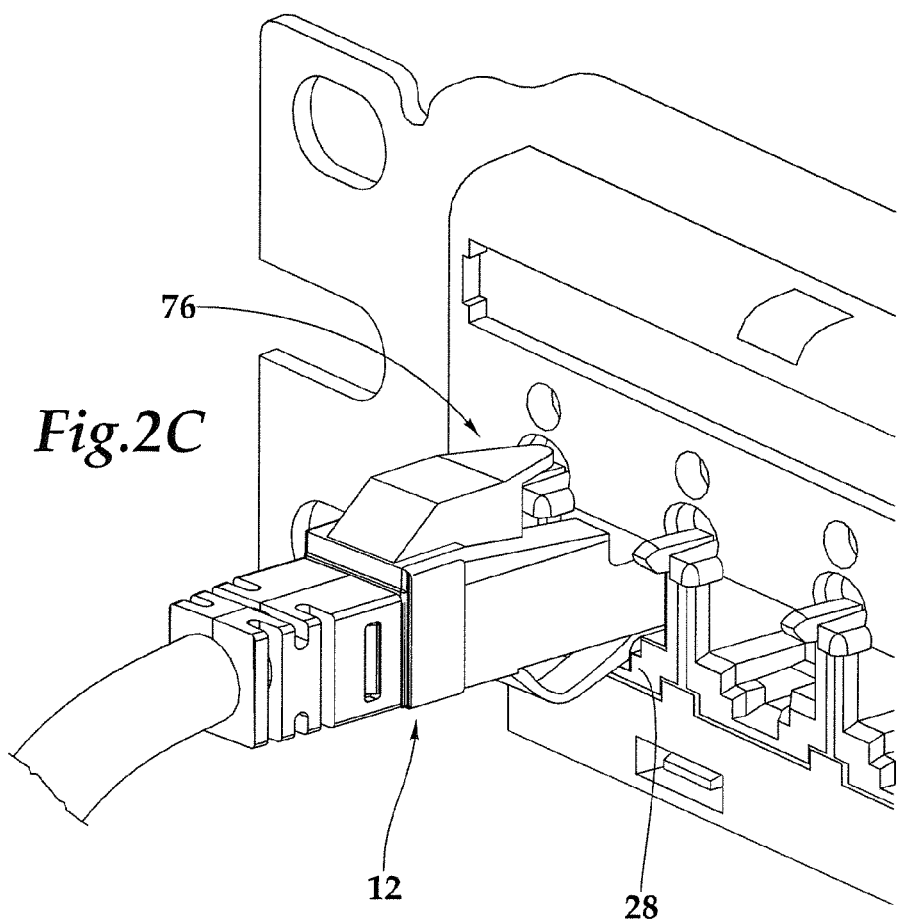
FIG. 2C is a perspective view of a patch panel plug of a patch cord plugged into an intelligent patch panel port.
Figure 2D:
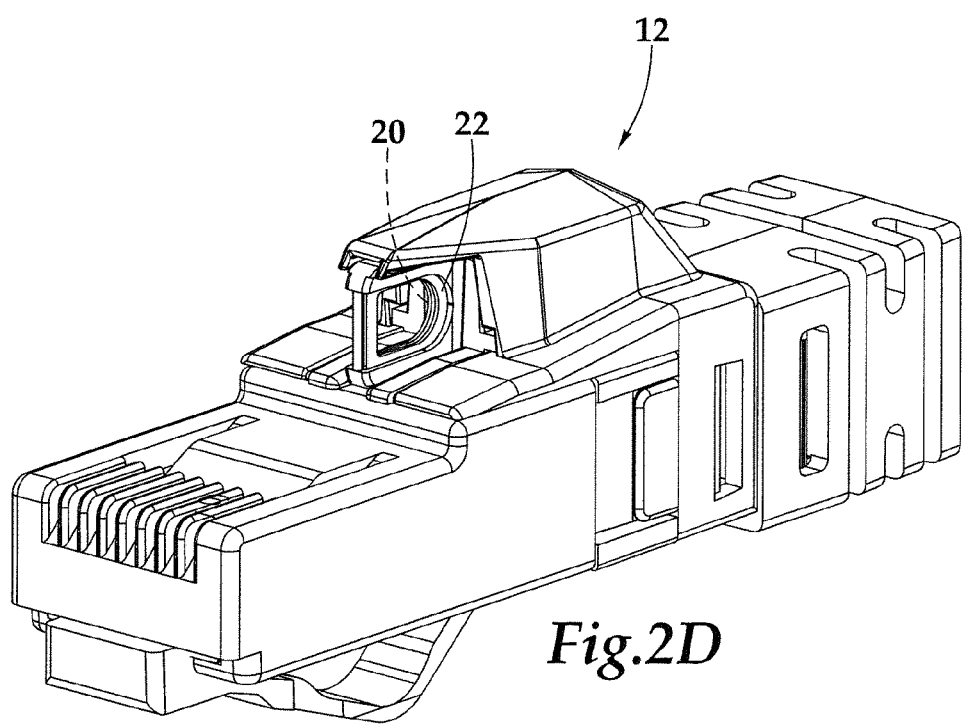
FIG. 2D is a perspective view of a patch panel plug of a patch cord.

FIG. 2A is a perspective view of a patch cord 10 connecting a switch port 72 of an Ethernet switch 74 to an intelligent patch panel port 28. FIG. 2B is a closer view of a switch plug 14 of a patch cord 10 plugged into a switch port 72, and FIG. 2C is a closer view of a patch panel plug 12 plugged into a patch panel port 28. FIG. 2D is a perspective view of a patch panel plug 12 showing the ninth and tenth contacts 20 and 22. When the patch panel plug 12 is mated to an intelligent patch panel port 28, the ninth and tenth contacts 20 and 22 of the plug 12 contact the ninth and tenth contacts 24 and 26 of the intelligent patch panel port in a contact region 76 shown in FIG. 2C.

FIG. 3A is a perspective view of a switch plug 14. A PCB cover 78 covers the LED PCB 36. The PCB cover 78 is transparent or translucent, allowing light from the LED's 44 and 46 to be seen at the rear of the cover. The plunger 80 that activates the switch 38 is also seen in FIG. 3A.

FIG. 3B shows a closer view of the switch mechanism 82. The plunger 80 is kept in an extended position by a compression spring 84, which can abut another portion of the plug at its opposing end. An extension 86 of the plunger 80 has a plunger contact 88 mounted thereon. The plunger contact 88 is shown in FIG. 3B in its "normally closed" position, in which the plunger contact 88 connects the pole 60 of the switch to the normally closed contact 42. As the plunger 80 is depressed by the front face 81 of the Ethernet switch 74 (as shown in FIG. 2B), the plunger contact 88 moves diagonally downwardly and to the right in the perspective shown in FIG. 3B, eventually completing a connection between the pole 60 and the normally open contact 40. According to one embodiment, inward travel of the plunger 80 of approximately 0.040" will make continuity between the pole 60 and the normally open contact 40.

FIG. 3C is an exploded view of the switch plug 14 showing: a main plug housing 90 that houses a load bar 92 and a wire divider 94. A shield 96 may be provided for shielded applications. A strain relief collar 98 is modified with features to accommodate the plunger 80, the LED PCB 36, and the PCB cover 78, which latches to latch teeth 99 provided on the strain relief collar 98. A plug boot 100 latches to boot latch teeth 102 of the strain relief collar 98.

FIGS. 4A and 4B are perspective views of a wire termination region of the switch plug 14. The ninth and tenth wires 16 and 18 are shown terminated at IDC's 32*a* and 32*b* respectively, inserted into wire slots 104 and trimmed to be flush with the side wall of the strain relief collar 98.

FIG. 5 is a perspective view of the LED PCB 36 without the other components of the switch mechanism 82.

FIG. 6 is a perspective view of the LED PCB 36 installed in the switch plug 14.

Figure 7A:
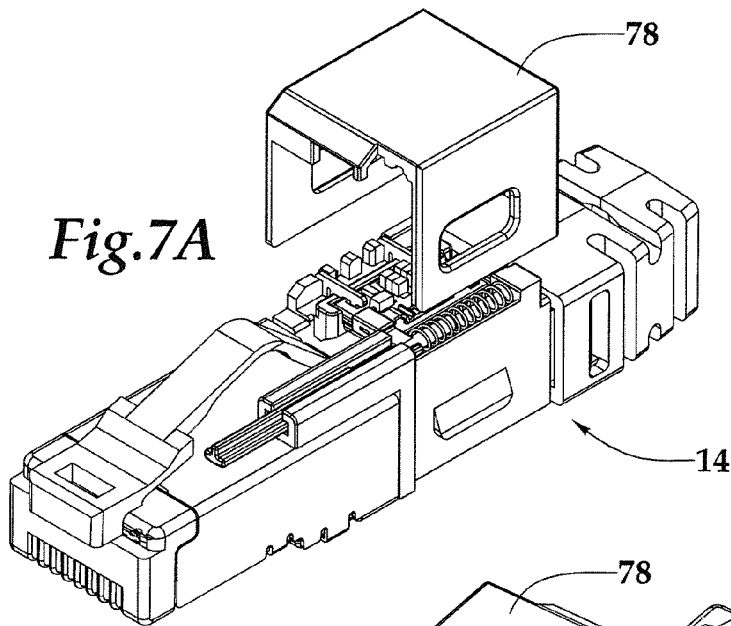
FIGS. 7A, 7B, and 7-C are perspective views of a switch plug showing the installation of a PCB cover on the switch plug.
Figure 7B:
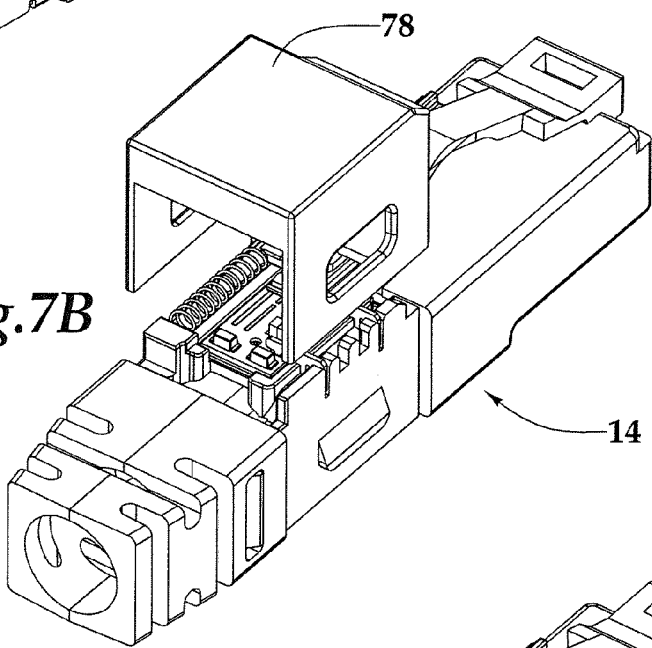
Figure 7C:
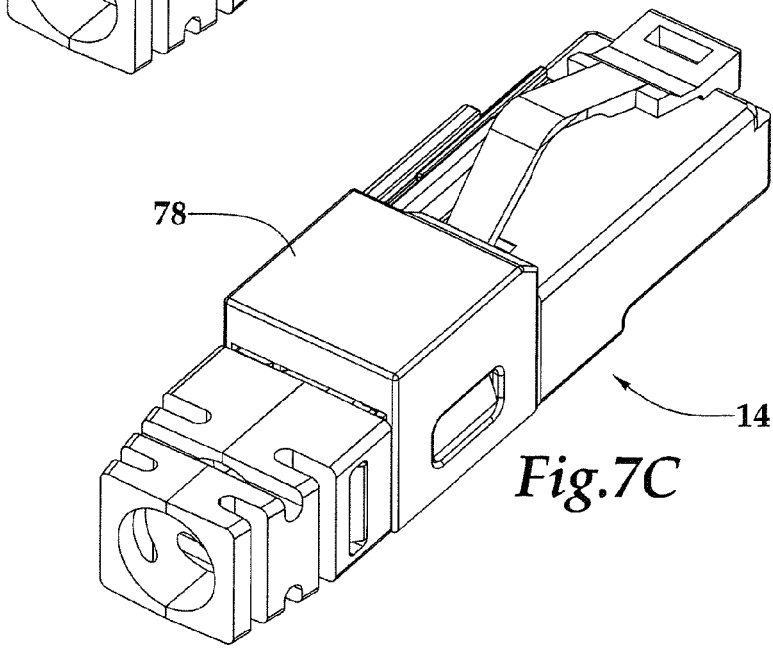

FIG. 7A is a front perspective view showing the PCB cover 78 ready for installation on the switch plug 14, and FIG. 7B is a similar view from the rear. FIG. 7C shows the PCB cover 78 installed on the switch plug 14.

Figure 8A:
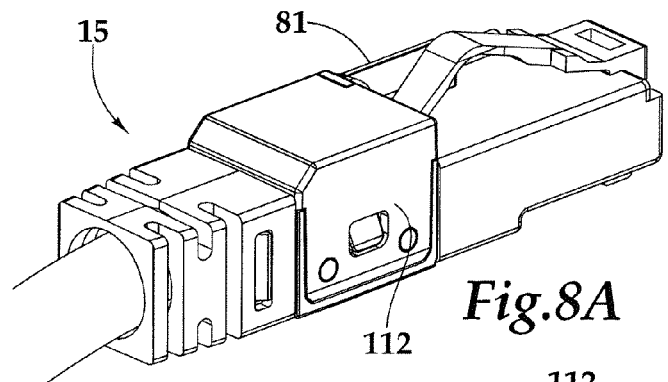
FIG. 8A is a perspective view of an alternate plug than can be used in the present invention.
Figure 8B:
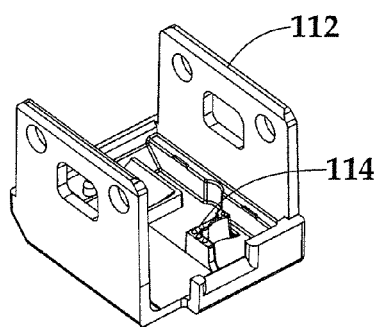
FIG. 8B is a perspective view of the underside of the cap of the plug of FIG. 8A.
Figure 8C:
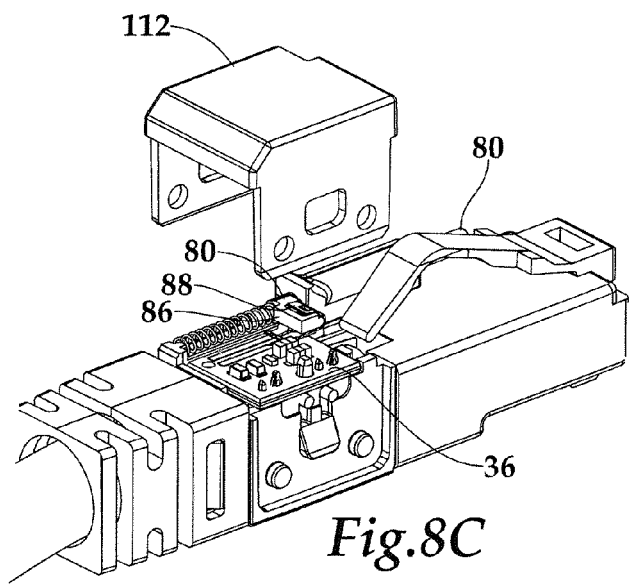
FIG. 8C is a perspective view of the plug of FIG. 8A with the cap removed and showing components of the plunger switch and the PCB.
Figure 8D:
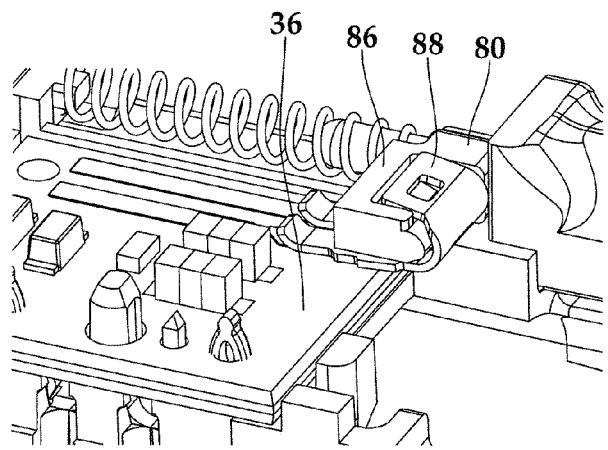
FIG. 8D is a perspective view plug of FIG. 8A focusing in on the components of the PCB and plunger switch.
Figure 8E:
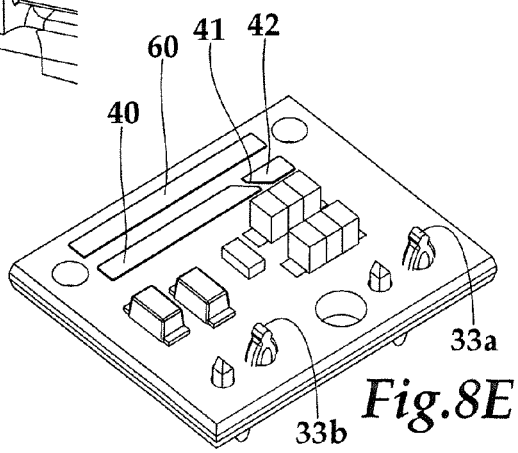
FIG. 8E is a perspective view of the PCB for the plug of FIG. 8A showing the traces for the pole, first switch contact, and second switch contact.

FIGS. 8A-E show an alternate embodiment of a plug 15 that can be used in the present invention. The plug 15 can have a cap 112, a PCB 36, and a plunger switch 81. As shown in FIG. 8B, the cap 112 can have a cap support 114 placed on the underside of the cap 112 to help prevent any deflection due to a downward force placed on the cap 112, which could impair the operation of and/or cause damage to the plunger switch 81. FIGS. 8C and 8D show an embodiment of a plunger switch 81 in which the plunger contact 88 curves around the underside of the extension 86 of the plunger 80. FIG. 8E shows traces that form the pole 60, first switch contact 40, and second switch contact 42 for the plunger switch 80. The first switch contact 40 and second switch contact 42 are separated by a gap 41 that is formed at an angle to enable a make-before-break connection. FIG. 8E also shows the use of insulation piercing contacts 33*a*, 33*b* to form an electrical connection between the PCB 36 and ninth and tenth wires 18, 16.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

The invention claimed is:

1. A mapping system for detecting the insertion and removal of a patch cord comprising:

an intelligent patch panel having a charging/sampling circuit, the charging/sampling circuit connected to first and second management contacts associated with a jack on the intelligent patch panel;

a patch cord with first and second management conductors;

a first plug connected to a first end of the patch cord, the first plug having first and second plug management contacts electrically connected the first and second management conductors, respectively, on the patch cord and configured to electrically engage the first and second management contacts, respectively, on the intelligent patch panel when the first plug is inserted in the jack on the intelligent patch panel; and a second plug connected to a second end of the patch cord, the second plug having a single-pole, double-throw switch configured to change states when the plug is inserted and removed from a jack, the plug further having a first capacitance connected to a first contact of the single-pole, double-throw switch and a second capacitance connected two a second contact of the single-pole, double-throw switch, and wherein the intelligent patch panel is configured to identify a connection status of the intelligent patch panel via the charging/sampling circuit.

2. The system of claim 1 wherein the jack on the intelligent patch panel also has an associated capacitor.

3. The system of claim 1 wherein the charging/sampling circuit determines the connection status of the patch cord at least in part based upon the total capacitance electrically connected to the charging sampling circuit.

4. The system of claim 1 further comprising a first light emitting diode connected as at least a part of a circuit in parallel with the first capacitor and a second light emitting diode connected as at least part of a circuit in parallel with the second capacitor.

* * * * *

UNITED STATES PATENT AND TRADEMARK OFFICE
CERTIFICATE OF CORRECTION

| | |
|---|---|
| PATENT NO. | : 8,414,319 B2 |
| APPLICATION NO. | : 13/618202 |
| DATED | : April 9, 2013 |
| INVENTOR(S) | : Satish I. Patel et al. |

Page 1 of 1

It is certified that error appears in the above-identified patent and that said Letters Patent is hereby corrected as shown below:

In the Claims

Col. 8/Line 2: Error reads as "…connected two a second contact…" and should read as "…connected to a second contact…"

Signed and Sealed this
Eighteenth Day of February, 2014

Michelle K. Lee
*Deputy Director of the United States Patent and Trademark Office*